E. HOWL & F. PERRY.
DRIVING BELT.
APPLICATION FILED SEPT. 30, 1913.
1,175,633.
Patented Mar. 14, 1916.
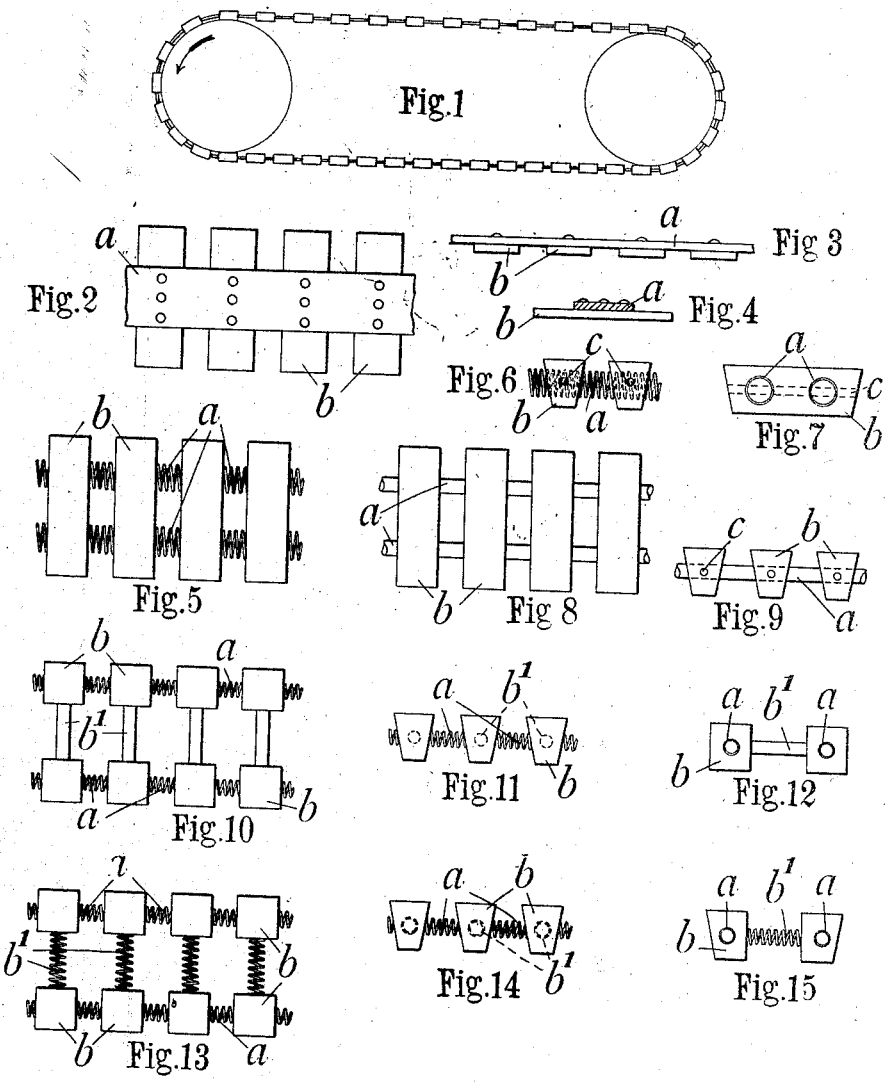
WITNESSES
W. C. Baker Jr.
Philip D. Rellhaus
INVENTORS
EDMUND HOWL
FRANK PERRY
BY
ATTORNEYS

UNITED STATES PATENT OFFICE.

EDMUND HOWL, OF THE QUARRIES, NEAR DUDLEY, AND FRANK PERRY, OF TIPTON, ENGLAND.

DRIVING-BELT.

1,175,633.  Specification of Letters Patent.  Patented Mar. 14, 1916.

Application filed September 30, 1913. Serial No. 792,591.

*To all whom it may concern:*

Be it known that we, EDMUND HOWL and FRANK PERRY, subjects of the King of Great Britain, residing, respectively, at The Quarries, near Dudley, England, and at Shrubbery, Bloomfield Road, Tipton, in the county of Stafford, England, have invented certain new and useful Improvements Relating to Driving-Belts, of which the following is a specification.

It has been shown by the present applicants that if a rubber or spirally wound steel wire driving belt is so proportioned that it can stretch from one and a half to six times its original length under different loads, then when the belt is used for transmitting motion from a driving to a driven pulley, considerable stretching can occur on the tight side without material change in the condition of the slack side. When the load is increased a correspondingly increased proportion of the motion of the driving shaft is utilized in extension of the belt itself, or in other words, a greater length of the belt runs over the driving pulley than over the driven pulley, with the result that the speed ratio between the driving and driven shafts varies automatically within certain practical limits.

We have found that while passing around the pulley on the driving shaft the tension in the belt relaxes, and in consequence there occurs around the pulley a progressive recovery in the belt of its unstretched condition. This results in a slight relative movement or creeping between the belt and pulley which when the belt is constructed from extensible material only produces excessive wearing and heating of the belt, and in consequence the belt is subject to rapid deterioration. The same phenomenon occurs to some extent at the pulley on the driven shaft. Excepting this defect we have found that the loss of efficiency due to the performance of internal work on the belt is not serious having regard to the advantage obtained by the automatically varying velocity ratio with increase of load, this being a very desirable result in some cases, such as the driving of machine tools, road vehicles, spinning and weaving machines.

The object of the present invention is to provide a practical extensible belt capable of producing useful variation of speed ratio, and the invention comprises an extensible or elastic belt having the properties above specified and having arranged therewith inextensible or inelastic parts adapted to make driving contact with the pulleys on the shafts.

It has previously been proposed to construct driving belts of rubber, of spirally wound steel wire, either bare or separated from the pulleys by coverings of leather or the like, also of spring connected links fitted with leather or other parts for making contact with the pulleys. In all cases, however, the extensibility has been provided solely to avoid transmission of shock through the belt, and thereby to insure smoother or more regular operation of the driven mechanism. A limited extensibility which is sufficient to avoid transmission of shock is quite useless for the object of this invention. We are not aware that it has ever been recognized that to provide an abnormal extensibility enables automatic variation of speed ratio over a large range to be obtained. The provision of a large degree of extensibility is, however, not sufficient in itself, the employment of inextensible parts as above described being also essential for a completely successful belt.

Referring to the accompanying sheet of explanatory drawings: Figure 1 is a diagrammatic side elevation of a belt constructed in accordance with this invention. Figs. 2, 3 and 4 are respectively plan, side elevation and end elevation of one form of our improved belt. Figs. 5 to 15 illustrate other forms of our belt.

The same reference letters in the different views indicate the same or similar parts.

In carrying the invention into effect as shown in Figs. 2, 3 and 4, a continuous rubber belt *a* has attached to its inner surface a number of short leather pieces *b* which coöperate with the surfaces of the pulleys and keep the rubber portion out of contact with such surfaces. Any convenient means may be employed for fixing the leather pieces in position on the belt. They may be vulcanized, riveted or otherwise attached.

In another modification as shown by the plan, side elevation and end elevation at Figs. 5, 6 and 7 respectively, spiral springs *a* are employed. The belt may be made from a continuous length of spirally wound steel wire, or two or more lengths arranged side by side and having blocks of wood or leather b attached thereto at short intervals for making contact with the pulleys. Movement of the blocks relatively to the springs may be prevented by pegs c. The leather or wood pieces may be connected by short spiral springs.

Figs. 8 and 9 are side and end elevations of a form of our belt in which rubber strands a are threaded through the blocks b.

Figs. 10, 11 and 12 illustrate by plan and side and end elevations a form of belt which differs from that shown in Figs. 5, 6 and 7, only in the shape of the blocks. In this case, each block consists of two parts joined by a strut or connecting piece b'. Figs. 13, 14 and 15 are similar to Figs. 10, 11 and 12 and show a similar belt, with the difference that the part b' consists of a compression spring. This form is adapted, more especially, for use with V-grooved pulleys, the opposite outer faces of the blocks being chamfered to correspond with the pulley groove, and the springs serving to press the said faces of the blocks against the sides of the groove. Such springs by providing for lateral variation in the width of the belt enable still further speed variations to be obtained.

The invention is not limited to any particular means for carrying the same into effect, as a large variety of combinations can be made complying with this invention. In all cases the extensibility is such that relatively large stretching of the belt can occur with variations of load.

It will be understood that the belts may be used on pulleys having flat rims or grooved rims by making the blocks or like parts in appropriate shapes.

Having thus described our invention what we claim as new and desire to secure by Letters Patent is:—

1. In elastic driving belts for use with pulleys, the combination comprising a continuous spring member capable of stretching to at least one and one half times its original length, and inextensible friction blocks secured at intervals to the spring member and adapted to make driving contact with the pulleys, the spring member being adapted to yield to a considerable extent between each of the adjacent blocks, substantially as described.

2. In elastic driving belts for use with pulleys, the combination comprising a pair of spiral springs capable of affording a relatively large amount of stretching, and inextensible friction blocks secured at intervals to the springs and adapted to make driving contact with the pulleys, the springs being adapted to yield to a considerable extent between each of the adjacent blocks, substantially as described.

3. In elastic driving belts for use with pulleys, the combination comprising springs capable of affording a relatively large amount of stretching, two parallel sets of inextensible friction blocks secured at intervals to the springs and adapted to make driving contact with the pulleys, and means whereby laterally opposite blocks in each set are retained at the required distance apart, substantially as described.

4. In elastic driving belts for use with pulleys, the combination comprising springs capable of affording a relatively large amount of stretching, two parallel sets of inextensible blocks secured at intervals to the springs and adapted to make driving contact with the pulleys, and spring means whereby laterally opposite blocks in each set are retained at the required distance apart, substantially as described.

In testimony whereof we have signed our names to this specification in the presence of two subscribing witnesses.

EDMUND HOWL.
FRANK PERRY.

Witnesses:
EDWARD MARKS,
FRANCIS MALPAS.